United States Patent [19]

Kikinis

[11] Patent Number: 5,430,609
[45] Date of Patent: Jul. 4, 1995

[54] MICROPROCESSOR COOLING IN A PORTABLE COMPUTER

[76] Inventor: Dan Kikinis, 20264 Ljepava Dr., Satatoga, Calif. 95070

[21] Appl. No.: 116,331

[22] Filed: Sep. 2, 1993

[51] Int. Cl.6 .......................... G06F 1/16; H05K 7/20
[52] U.S. Cl. .................................. 361/687; 361/680; 361/711; 361/719; 62/259.2
[58] Field of Search ................... 364/708.1; 361/680, 361/687, 690, 698, 699, 702, 707, 703, 709–711, 717–719, 722; 62/259.2; 165/80.2–80.4, 104.33

[56] References Cited

U.S. PATENT DOCUMENTS

| | | | |
|---|---|---|---|
| 4,316,236 | 2/1982 | Lechner et al. | 361/704 X |
| 4,997,032 | 3/1991 | Danielson et al. | 361/698 X |
| 5,237,486 | 8/1993 | LaPointe et al. | 361/687 X |
| 5,313,362 | 5/1994 | Hatada et al. | 361/709 |
| 5,316,491 | 5/1994 | Satou et al. | 439/159 |
| 5,331,506 | 7/1994 | Nakajima | 361/683 |
| 5,355,357 | 10/1994 | Yamamori et al. | 361/680 X |
| 5,383,340 | 1/1995 | Larson et al. | 62/259.2 |

*Primary Examiner*—Michael W. Phillips
*Attorney, Agent, or Firm*—Donald R. Boys

[57] ABSTRACT

A CPU IC package for a computer system is cooled by a layer of compressible, heat-conducting material compressed between the IC package and a heat sink plate. In one embodiment the heat sink plate is a wall element of an access panel providing access to the interior of the computer system. Closing the access panel compresses the heat-conducting material between the IC package and the heat sink plate. To provide mechanical stability, the heat-conducting material is fastened to one of the heat sink plate and the IC package. In alternative embodiments the plate may be mounted outside the enclosure of the system with the heat-conducting material extending through an opening in a wall of the enclosure.

12 Claims, 4 Drawing Sheets

MICROPROCESSOR COOLING IN A PORTABLE COMPUTER

FIELD OF THE INVENTION

This invention is in the area of relatively small general-purpose computer systems, such as laptop, notebook, subnotebook, and palmtop models, and pertains more specifically to apparatus and methods for dissipating heat generated by high-power profile microprocessors in such systems.

BACKGROUND OF THE INVENTION

There is a large and competitive market for portable computers, and new and more powerful products are being rapidly developed. In these developments, a persistent design problem is that state-of-the-art microprocessors, which are desirable in these new systems, generate a considerable amount of waste heat. This heat buildup presents a design challenge, since the general trend in portable general-purpose computers is for smaller and lighter units. These smaller units are classified as subnotebooks.

Designers are now packing much of the same power and functionality of a full-sized notebook into a device measuring about 7 by 10 by 1.25 inches or less and weighing between two and four pounds. These two market trends of more powerful notebooks, reaching performance levels of desk-top computers, and smaller portable general-purpose computers, are defining future engineering efforts. Since there is typically no room for a fan in these products, notebooks must be engineered to dissipate heat passively to cool their components.

Presently, Intel Corporation's 486 line of microprocessors, as well as other manufacturers' devices, are being adapted for use within the close confines of notebook general-purpose computers. Intel's 486 family of CPUs contains 1.2 million transistors, three times as many as in the previous 386 series of CPUs. Heat is generated from millions of silicon transistors packed into smaller and smaller integrated circuits (ICs), switching on and off millions of cycles per second. This mechanism of switching on and off at the rate of the CPU, sometimes at frequencies as high as 66 Mhz, is a major factor in the generation of waste heat. A relatively large amount of work goes into alternating the voltage inside an IC's integrated bus. It is necessary for a semiconductor switch to electrically connect to either the power supply's positive or negative output and conduct a momentary but massive flow of electrons. The result is a charging or discharging of the electric potential that is stored in the circuit trace. Each time the IC wire trace's voltage is charged, a brief pulse of electron flow is typically conducted through the semiconductor switches, A compounding of the problem of heat buildup occurs because the increasing thermal resistivity as temperature increases causes even more rapid heat buildup. The waste heat must be removed, otherwise the snowballing effect of more and more heat compromises the system performance.

More sophisticated software makes matters worse. IBM Corporation's OS/2.1 TM and state-of-the-art UNIX operating systems already employ 32-bit processing, which uses a 486's intrinsic architecture fully. Meanwhile, Microsoft is preparing a new version of Windows, dubbed Windows NT, which will do the same. These operating system environments use the maximum data bandwidth to transfer information within the computer system. This leaves few circuits idle within the tightly configured CPUs, and thermal engineering parameters are therefore tested at maximum levels for maximum periods of time. Another technical development uses faster bus systems to link the faster CPUs to system peripherals. Rather than the slow input/output (I/O) speeds of 8 megahertz many desk-top and file server general-purpose computers are now using, newer systems employ Video Electronics Standards Association (VESA) Local Bus or Extended Industry Standard Architecture (EISA) technologies, and fast proprietary systems. These pathways and associated faster peripherals effectively transfer data at the full external speed of the system's microprocessor. This demands the full computational attention of the CPU to satisfy data-hungry devices such as video and disk controllers. The addition of faster bus systems increases the loads inside any CPU and the generation of peak waste heat needing to be removed from the immediate area.

Intel and other vendors have alerted microcomputer manufacturers in their service manuals to the operating temperature range of the 486 chips. The temperature limits for safe operation are between variously quoted, A typical safe range is given as between 32 and 185 degrees Fahrenheit. Intel suggests that manufacturers use extra cooling fans and heat sinks to maintain these temperatures. These suggestions are strongly directed to manufacturers of "slim-line" computers. Therefore many are incorporating into their microcomputers extra fans and/or heat sinks directly attached to the 486 CPU or wherever design constraints will allow for proper thermal cooling.

Thermal concerns in electronic packaging have reached the point where designers of general-purpose computers can no longer afford to treat the dissipation of waste heat as an afterthought. With faster and hotter-running generations of ICs on the way, a prudent approach to packaging at both the IC level and at system level is imperative, The CPU duty life and performance are critical considerations while running temperatures are close to upper specification limits. A military computer design rule-of-thumb says that for every 10 degrees Centigrade rise above maximum temperature specification the chip's reliability is cut in half. Manufacturers that don't address the thermal implications that directly affect data transfers within CPU clock speed parameters risk premature microprocessor failures or malfunctions. An overheated CPU can cause various problems, ranging from data corruption to the loss of file-allocation tables to the microprocessor shutting itself down, or even self-destruction in extreme cases.

Some manufacturers have introduced combination heat sinks and cooling fans that attach directly to the CPU, These devices are too bulky for portable general-purpose computers measuring ½ inch high. They have established manufacturing efforts to address the inherent waste heat generated by the present production technology levels of the 486 microprocessors. Manufacturers such as Dell TM Computers have already been shipping 486-based desk-top microcomputers with built-in coolers.

Intel Corporation and other semiconductor manufacturers face more challenges in developing new generations of high-performance microprocessors. Intel's new Pentium TM microprocessor is due to succeed the 486 family of microprocessors, and will produce significantly higher levels of waste heat. The Pentium CPU will generate as much as 16 watts just to run itself.

Intel has established a certification procedure with microcomputer manufacturers to qualify general-purpose computers for safe Pentium use. The Pentium fits in a 238-pin socket that is standard on a variety of microcomputers and will generate enough heat to melt or damage surrounding components if not properly cooled. Presently only 10% of the tested name brand microcomputers, none of which are portables, are expected to have enough cooling for full certification.

The present invention addresses these thermal restraints particularly pertaining to the future use of high-performance microprocessors in portable general-purpose computers. The use of the next generation "hot" microprocessors will be soon introduced into the confining environments of portable general-purpose computers. The primary engineering "hurdle" of properly controlling CPU waste heat in the faster CPUs must be overcome to have them installed successfully. What is needed is a means of removing CPU-generated waste heat economically and effectively within the even smaller confines of a portable computer, guaranteeing optimal processing performance, longevity and reliability.

SUMMARY OF THE INVENTION

In an embodiment of the invention, a method for cooling a heat-producing IC package assembly to be mounted within a computer's enclosure is provided, comprising the steps of a) mounting the IC package assembly within the computer's enclosure with the package spaced apart from a substantially coplanar heat-sink plate, b) affixing a layer of a compressible, heat-conducting material to one of the IC package assembly and the heat-sink plate, and c) reducing the space between the heat-sink plate and the IC package assembly to compress the compressible, heat-conducting material.

In one aspect of the invention the heat sink plate is a wall structure of the computer system's enclosure and the compressible heat-conducting material is compressed between the IC package assembly and the wall structure. In an alternative embodiment the wall structure is part of a hinged panel allowing access to the interior of the computer system's enclosure. In other aspects of the invention auxiliary plates may be mounted within or without the enclosure, and may be configured to increase heat transfer efficiency, may in some instances be cooled by powered means.

DESCRIPTION OF THE PREFERRED EMBODIMENTS

The present invention addresses future needs for heat dissipation within the closed environments of portable general-purpose computers. Presently, Intel's Pentium CPU produces 16 watts of waste heat and Digital Electronics Corporation's Alpha processor gives off approximately 23 watts. Other high-performance microprocessors such as Hewlett-Packard Corporation's Precision Architecture (PA)RISC chip, IBM's RS/6000 PowerStation 365, Motorola Inc.'s 88110 and MIPS Technologies Inc.'s R4000 produce, because of their advanced meg-transistor design, levels of CPU waste heat that define their miniaturization limits. It is expected that CPU waste heat three to five years in the future may be in the range of 100 watts.

In a preferred embodiment of the invention, waste heat is removed from a microprocessor by utilizing the very limited interior real estate of a portable computer in a unique manner.

Figure 1:
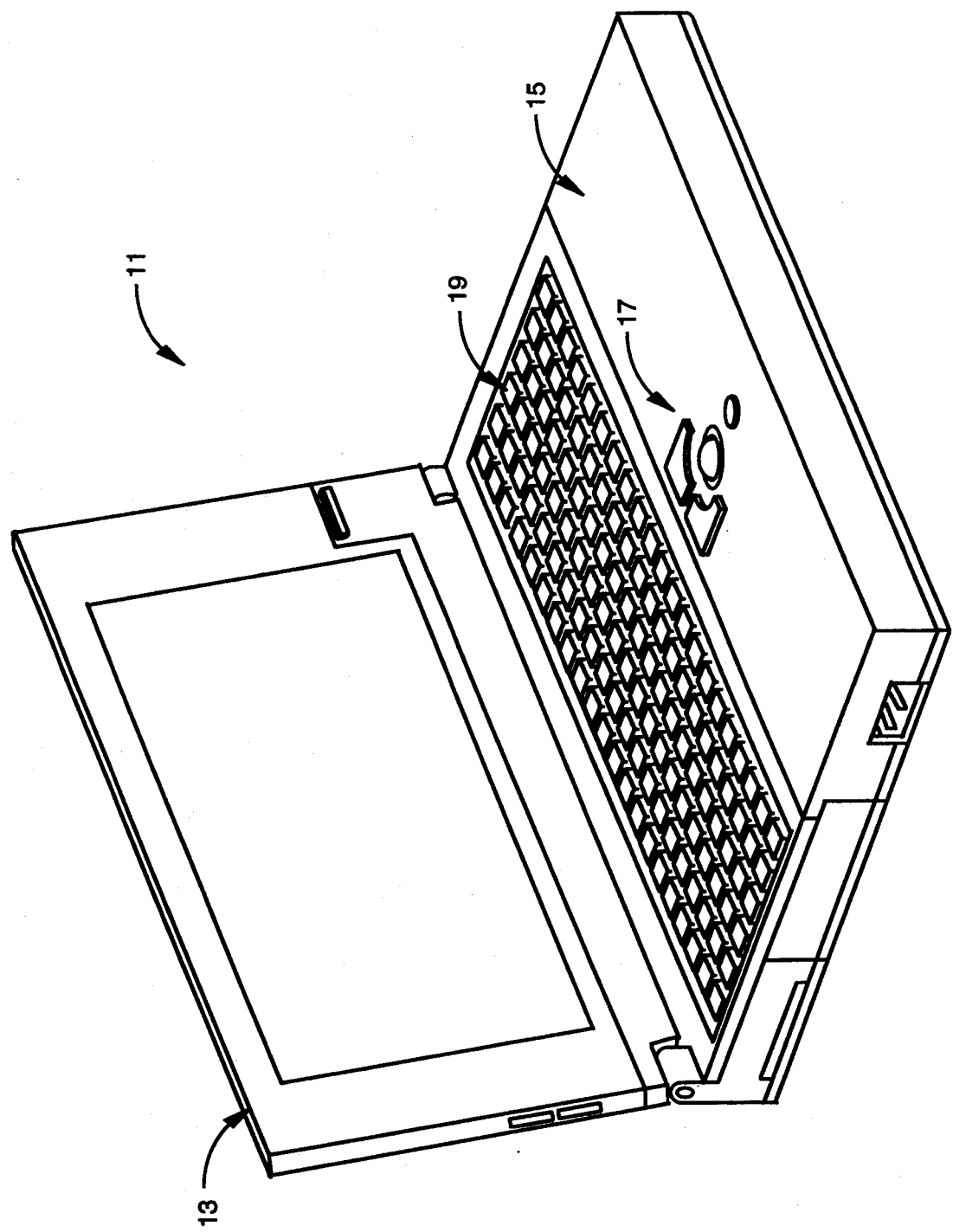
FIG. 1 is an isometric view of a notebook computer according to an embodiment of the present invention.

FIG. 1 is an isometric view of a notebook computer according to an embodiment of the invention, comprising a display 13, a handrest area 15 with a built-in, removable pointer device 17, and a keyboard 19. All of the principle printed circuit boards in this computer are incorporated in the volume of the package below the keyboard and the handrest area.

Figure 2:
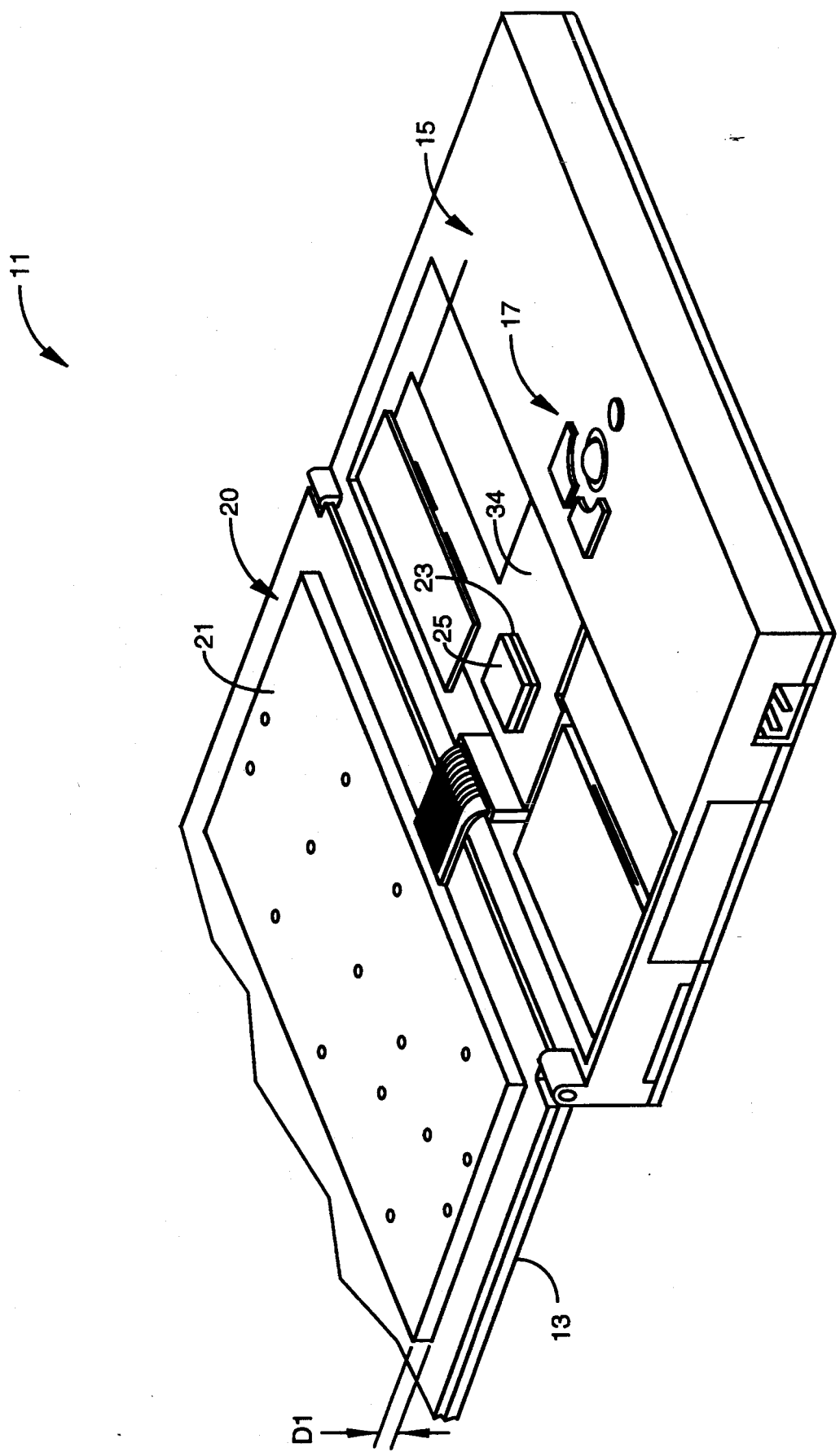
FIG. 2 is an isometric view of the notebook computer of FIG. 1 with the keyboard pan hinged open.

In the embodiment of the present invention shown in FIG. 1, keyboard 13 is implemented as a hinged unit 20 pivoting about the same hinges as the display. FIG. 2 shows hinged unit 20 in an "open" position. The underside of assembly 20 comprises a keyboard pan 21 constructed of a thermally conducting material, typically a metal. When the keyboard assembly is open as shown in FIG. 2, access is provided to elements assembled below the keyboard. Printed circuit board (PCB) 34 carries the CPU microprocessor 23 in this embodiment, and is mounted so that the keyboard pan closes directly over the CPU. Thermal contact between the CPU package and the keyboard pan is accomplished by a compressible, heat-conducting material, such as Chomerics (TM) aluminum oxide-filled rubber. A pad 25 of such material is adhesively mounted to the CPU in this aspect of the invention, so the keyboard pan will contact the heat-conducting material and provide some compressive force over the CPU. There are other ways pad 25 may be mounted.

With the keyboard assembly closed over the CPU, heat generated by the CPU is transferred by conduction through the compressive material and into the keyboard pan having thickness D1. The keyboard pan has a large surface area and a large thermal mass relative to the body of the CPU, and effectively sinks heat from the CPU and radiates to the surroundings. In an alternative embodiment the compressive, heat-conducting material may be affixed to the underside of the keyboard pan in a position to compress over the CPU when the keyboard is closed and latched. The same technique may be applied as well to other circuit components that generate heat, such as DRAM chips and the like.

Typically, the keyboard of a portable general-purpose computer measures about 11.5 centimeters by 27 centimeters, providing a radiating area of about over 300 square centimeters. In embodiments of the invention the keyboard pan may be fashioned of various materials and in thicknesses to facilitate the optimal dissipation of CPU waste heat. Aluminum is a preferred material. A significant portion of the total CPU waste heat is transferred through the top surface of the CPU to the conducting compressible material to the bottom of the keyboard pan. The pan radiates to the surroundings and transfers heat by convection to the air above the keyboard and between the keys on the keyboard.

In other embodiments of the present invention, the dimensions and shape of the keyboard heat sink pan are configured to take maximum advantage of factors such as air circulation, thermal conductivity, convection heat-transfer coefficients and surface emissivity. The configuration of the keyboard pan may incorporate add-on segments in available areas immediately perpendicular to its plane, increasing the surface area of the pan. Such an add-on may be attached to an exiting conventional keyboard pan with conduction adhesive in another embodiment. By this means heat sinks may be installed in existing portable general-purpose computers.

In another embodiment of the present invention, considering the thickness constraint D1 between the bottom of the keyboard and the top of the CPU, the add-on design may be mounted with an air gap between the keyboard and the heat sink. This may be a consideration in design to maximize the heat transfer effects due to convection and/or radiation. In this embodiment the heat sink may be a "finned" or "waffled" configuration.

Figure 3A:
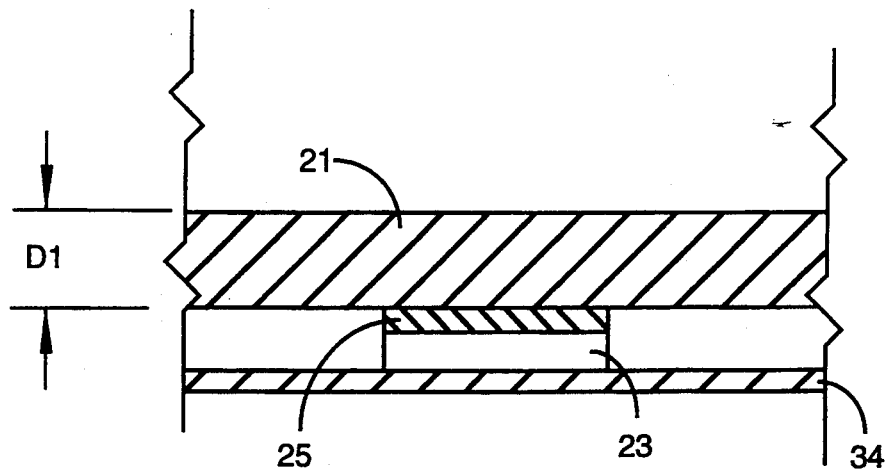
FIG. 3A is a cross-section through a microprocessor, a heat-conducting material, and the keyboard pan in an embodiment of the invention.
Figure 3B:
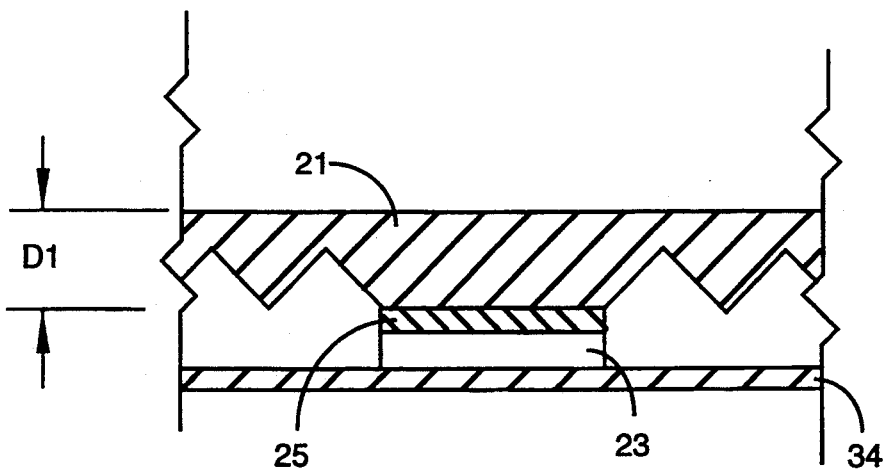
FIG. 3B is a cross-section view similar to FIG. 3A in an alternative embodiment.
Figure 3C:
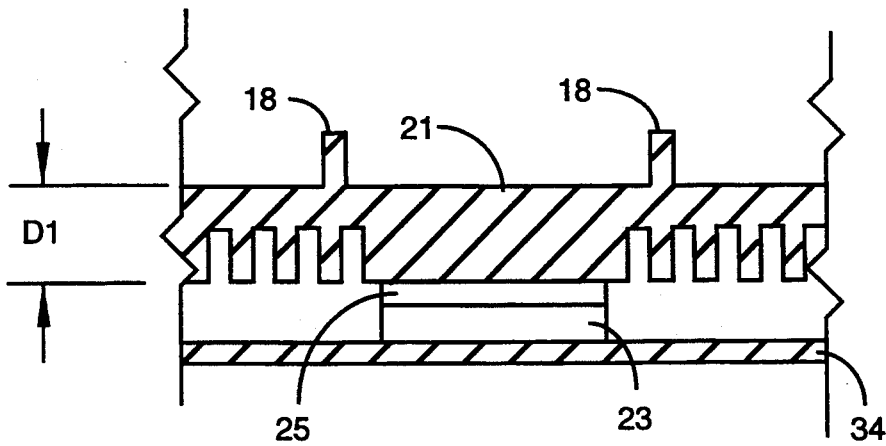
FIG. 3C is a cross section view similar to FIG. 3A in yet another embodiment of the invention.

FIG. 3A is a cross-section through PCB 34, microprocessor 23, conducting compressible material pad 25, and "closed" keyboard pan 21 in one embodiment of the invention, wherein pan 21 is a flat sheet of material. In another embodiment shown in FIG. 3B, the pan is shaped with v-grooves to increase surface area, and in FIG. 3O, the pan is grooved on the underside with vertical grooves to extend the surface area, and has extension ridges 18 extending between the keyboard keys to aid in dissipation of excess heat.

A hinged keyboard is a desirable feature, but not necessary to embodiments of the invention. In existing portable computers, the compressible material according to the invention may be installed onto a CPU or other heat-producing component, or affixed to a wall of such a system and pressed against the top of a CPU or other heat-producing component upon assembly or reassembly. The heat sink's location and mass are not specifically limited and can be conveniently located per the manufacturer's or user's preferences.

In another embodiment of the invention, the CPU may be located close to the bottom of a computer's case and mounted facing down. A case opening allows for the compressible conduction material to attach directly to the CPU and to an external thermal conducting base plate on the bottom of the case. Sufficient air gaps above and below the base plate can be provided using acceptable retractable stand-offs from the case the plate and from the plate to the supporting surface.

Figure 4:
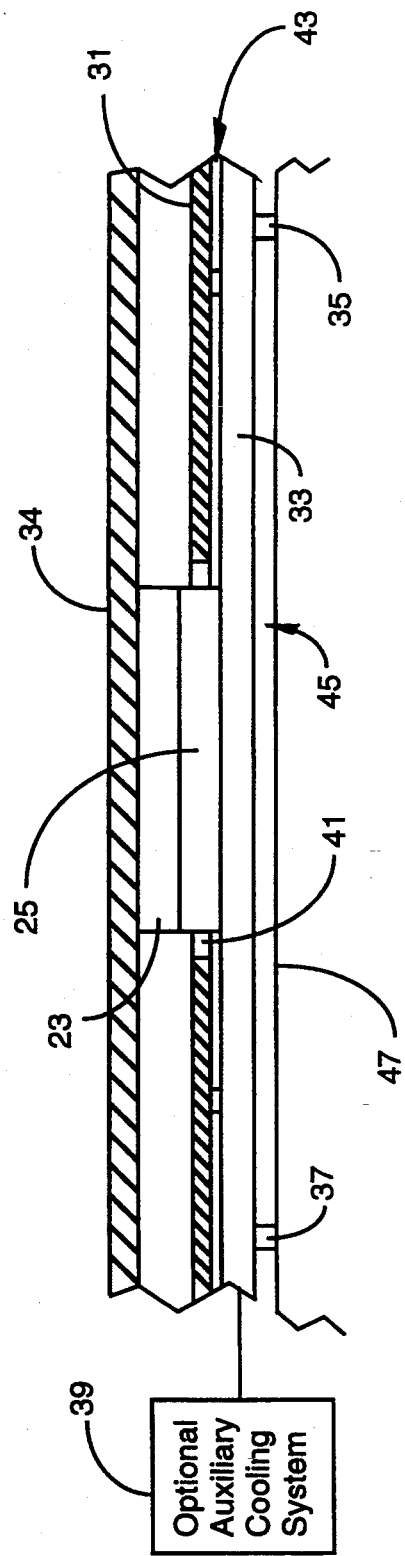
FIG. 4 is a cross section view of another embodiment with an externally mounted heat-sink plate.

FIG. 4 illustrates a CPU 23 on a PCB 34 located close to the bottom 31 of a computer's case and mounted facing down. A case opening 41 allows for compressible conduction material 25 to attach directly to the CPU and to an external thermal conducting base plate 33, as a heat sink, on the bottom of the case. Air gaps 43 and 45 above and below the base plate are provided using stand-offs such as standoffs 35 and 37 from the case to the plate and from the plate to a supporting surface 47. An optional auxiliary cooling system 39 is shown coupled to plate 33.

In another embodiment of the invention the heat sink pan may incorporate a closed liquid-cooling system with or without a small circulation pump and heat exchanger. A mini refrigeration system may be incorporated with such a design as the inventor has intended assuming technological advancements in battery capacities and system efficiencies. In another aspect, heat pipes may be used as an instrument for heat transfer.

In yet another embodiment, CPUs may be designed to provide maximum effect in embodiments of the present invention. For example, a CPU may be designed with its heat-producing elements arranged to transfer heat with maximum efficiency to an area of the package where compressible conductive material may be mounted or may contact to transfer heat away from the package.

It will be apparent to one skilled in the art that there are many alterations in detail that might be made without departing from the spirit and scope of the present invention, Some of these alternatives have already been described, such as the incorporation of the invention into an external fitted attachment and/or into the base of the portable general-purpose computer, It is possible to implement the invention into existing packaging restraints with or without a hinging keyboard or other portion of the case. There are a number of equivalent ways that several alternatives may be implemented in order to provide sufficient cooling to present and future generations of "hot" microprocessors.

What is claimed is:

1. A method for cooling a heat-producing IC package assembly to be mounted within a housing of a portable computer, such as a laptop or notebook computer, comprising steps of:
    mounting said IC package assembly within said housing with the package assembly positioned directly below a closed position of a pivoted keyboard assembly comprising a heat sink plate;
    affixing a layer of a compressible, heat-conducting material to one of said IC package assembly and said heat-sink plate; and closing said pivoted keyboard assembly to compress said compressible, heat-conducting material between said heat sink plate and said IC package assembly, such that heat produced by said IC package assembly may be absorbed by said heat sink plate.

2. The method of claim 1 wherein said heat-producing IC package assembly is a microprocessor for providing CPU functions for said computer 3. The method of claim 1 wherein said heat sink plate is configured on at least one surface to increase the surface area of said plate to improve heat transfer away from said plate.

4. The method of claim 1 wherein said heat sink plate comprises extension structures between keys on said keyboard.

5. A method for cooling a heat-producing IC package assembly to be mounted within a housing of a portable computer, such as a laptop or notebook computer, comprising steps of:
    mounting said IC package assembly within said housing with the package assembly positioned adjacent to a wall of said housing;
    providing an opening in the wall of the housing adjacent to the IC package assembly;
    affixing a layer of a compressible, heat-conducting material to one of said IC package assembly and a heat-sink plate; and mounting said heat sink plate adjacent to said wall outside said housing such that said heat-conducting material extends through said opening and is compressed between said IC package assembly and said heat sink plate.

6. The method of claim 5 wherein said heat sink plate is cooled by an auxiliary cooling system.

7. A heat transfer system for conducting waste heat away from an IC package assembly in a housing of a portable computer, comprising:
   a volume of compressible heat-conducting material contacting said IC package assembly; and
   a heat-sink plate spaced apart from said IC package assembly such that said compressible heat-conducting material is compressed between said heat-sink plate and said IC package assembly;
   wherein the heat sink plate is a part of a hinged keyboard assembly, and the heat-conducting material is compressed between the IC package assembly and the heat sink plate as a result of moving the hinged keyboard assembly to a closed position.

8. A heat transfer system as in claim 7 wherein said heat sink plate comprises extension structures between keys on said keyboard.

9. A heat transfer system as claim 7 wherein said heat-producing IC package assembly is a microprocessor for providing CPU functions for said computer.

10. A heat transfer system as in claim 8 wherein said heat sink plate is configured on at least one surface to increase the surface area of said plate to improve heat transfer away from said plate.

11. A portable computer system, such as a laptop or notebook computer system, comprising:
    a housing having a hinged keyboard comprising a heat sink plate;
    a printed circuit board having an IC package assembly mounted thereon, said printed circuit board positioned within said housing to place said IC package assembly adjacent to said heat sink plate with said hinged keyboard closed; and
    a volume of compressible, heat-conducting material affixed to one of said IC package assembly and said heat sink plate such that said compressible, heat-conducting material is compressed between said heat sink plate and said IC package assembly with said hinged keyboard closed.

12. A computer system as in claim 11 wherein said keyboard comprises extension elements between keys on said keyboard as heat-dissipation elements.

* * * * *